United States Patent Office 3,387,121
Patented June 4, 1968

3,387,121
POWER DEMAND PREDICTING COMPUTER
CONTROL SYSTEM
Michael Maczuzak, Wickliffe, and John V. Werme, Painesville, Ohio, assignors to Bailey Meter Company, a corporation of Delaware
Filed Feb. 12, 1964, Ser. No. 344,487
11 Claims. (Cl. 235—151.21)

ABSTRACT OF THE DISCLOSURE

A power consumption control system wherein contact closures in watt-hour meters produce pulses which are converted to represent megawatt-hour consumption, the pulses being totalized in a total power counter. A synchronous clock causes the total power counter to reset at the end of a pre-selected period of time known as a demand period. The pulse count entered in the total power counter is extrapolated at selected intervals of the demand period to determine what final power consumption in the demand period could be expected if the present rate were continued through the entire demand period. This extrapolated value is compared to a desired level of power consumption and a deviation of the extrapolated value beyond preset limits will initiate control of a select portion of the load system thereby maintaining power consumption at the desired level.

---

Figure 1:
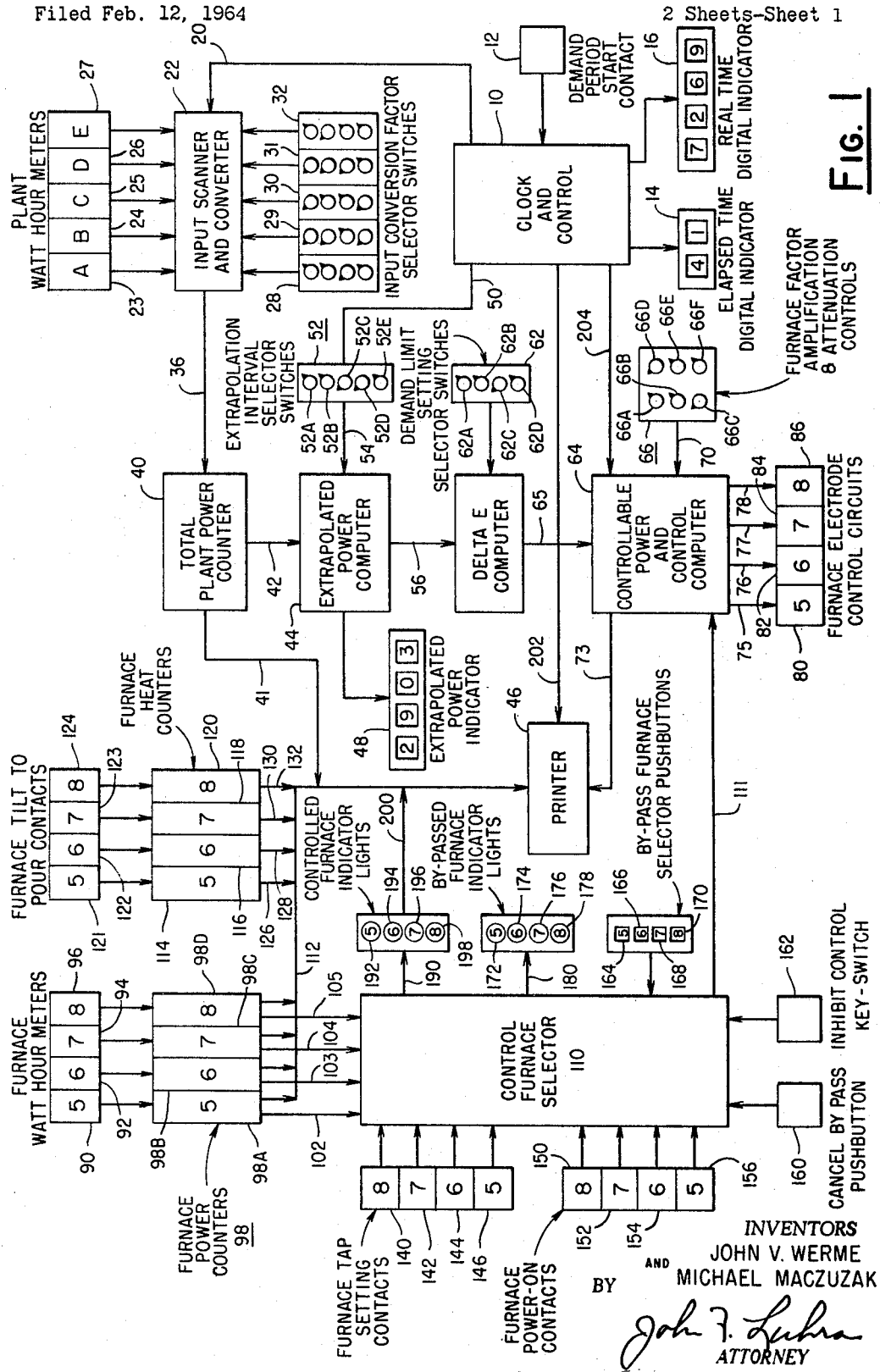

This invention relates to control systems and, more particularly, to an electrical power demand predicting computer control system particularly adapted to control large industrial loads.

Attempts have been made in the past to anticipate electrical loads on the basis of computations made at equally spaced intervals within a demand period and projecting these values through the demand period and controlling the load in accordance with this projected, or anticipated demand. These systems are concerned primarily with reducing the load or maintaining the load less than the predetermined demand limit and thus do not utilize the maximum available load throughout the demand period. Accordingly, power which might be consumed at a cheaper rate is not consumed. In other words, the load anticipation does not contain provision for maintaining the highest possible load factor on the system.

Throughout this application, numerous terms will be employed in accordance with the following definitions:

A clock is a source of standard electrical signals frequently employed in electronic systems to control the operation of numerous subassemblies or subsidiary circuits.

Extrapolation is a prediction of the value a variable will have at some future time based on measurements of past values of the variable.

Converging extrapolation is extrapolation made with increased frequency during the terminal portion of a predetermined period of time.

A controllable load unit is a load unit which is used to regulate an amount of power consumed by a load system.

A demand period is an interval, usually thirty minutes, set by the power company on which the billing rate for a period of time, such as a month, is based.

Sub-period is a division of a demand period.

Maximum demand is the maximum power consumption during any demand period within the billing period and is used in establishing the billing rate.

Demand limit is a predetermined value of power consumption for the demand period, set by the power company, which establishes the base billing rate. Normally, if the demand limit is exceeded, the billing rate is materially increased, whereas if the power consumption does not equal the demand limit there is no reduction made in the billing rate. Ordinarily therefore, it is desirable to have the power consumption equal but not exceed the demand limit.

Delta E is a power increment equal to the extrapolated value or predicted demand less the demand limit.

A furnace factor is the rate at which a controllable load unit, and as a control furnace, consumes power. An amplification adjustment is a means for changing the furnace factor to make positive values of delta E appear larger to the computer.

An attenuation adjustment is a means for changing the furnace factor to make negative values of delta E appear smaller to the computer.

Load factor is the ratio of the power consumption during a demand period to the demand limit.

Because the prior art electrical load anticipators or computers fail to utilize the highest posible load factor or to provide information by which the highest possible load factor might be obtained, it is an object of this invention to provide an improved load anticipator incorporating this feature.

Another object of this invention is to provide a control system which controls the demand of an electrical load to prevent the load from exceeding a predetermined maximum demand while maintaining a load factor approaching unity.

It is another object of this invention to control the demand of an electrical load to a high degree of accuracy.

Another object of this invention is to update predicted demand with increasing frequency and accuracy over the demand period by employing converging extrapolation.

Another object of this invention is to calculate the optimum time at which to control a significant fraction of the total electrical load and to automatically control this fraction to maintain a unity load factor.

Another object of this system is to reduce the cost of electrical power per kilowatt hour by maintaining a unity load factor in each demand period.

Another object of this invention is to reduce the cost of electrical power per kilowatt hour by automatically controlling a load unit according to the amount of power the load unit would consume during the remainder of the demand period.

Another object of this invention is to provide a control system for an electrical load which reduces the cost of power per kilowatt hour by automatically selecting the one of a plurality of controllable load units which has consumed the least amount of power during the elapsed portion of a demand period and to control this load unit to maintain a unity load factor.

Still another object of this invention is to provide a load control system which limits the demand while maintaining the power consumed as closely as possible to a predetermined maximum demand by monitoring the total rate of power consumption and computing the optimum times for removing and restoring load units to the system.

The system will be described in conjunction with a load system which includes a plurality of electrical furnaces. It is understood, however, that this system could be employed for any load system in which units of the load can be controlled. Because in the embodiment of our invention now to be described the total load may be expected to vary in an unpredictable fashion and because only a large unit of load can be removed from and restored to the system to limit the peaks and fill the valleys, there are two aspects to be considered. One of these aspects is that the average rate of power consumption as measured over short intervals of time early in the demand period does not necessarily represent the average rate that may be expected to continue throughout the remainder of the period; whereas, the average rate as measured over short intervals of time becomes more and more important as the time remaining in the demand period diminishes.

The second aspect is that even though the rate of power consumption at some time during the period may indicate that the demand limit will possibly be exceeded, normal load swings occurring later in the demand period may change the situation so that control is not actually required for maintaining the demand limit.

Thus, in order to be most effective, the control system, first, periodically predicts demand with increasing accuracy by means of predicting average rates of power consumption that may possibly last for the remainder of the demand period while taking into account power already consumed; and, secondly, delays control actions until the last possible moment in order to permit normal load swings to average out as much as possible without control.

Advantageously, the control system computes the average rate at which power is consumed over progressively smaller sub-periods during the demand period. At the end of each sub-period this average rate is extrapolated over the time remaining in the demand period in order to determine how much power will be consumed if this rate continues for the remainder of the demand period. Thus, the predicted demand at the end of each sub-period is derived by adding accumulated power already actually consumed to the product of the present computed average rate times the time remaining in the demand period.

If, early in the period, a surge in the rate of power consumption were included in the extrapolation, an unrealistic extrapolated value (i.e., predicted demand) would result. Whereas, a brief duration high or low rate of power consumption extrapolated in the last minutes of the demand period produces a realistic extrapolated value. Therefore, converging extrapolation is employed in which the sub-periods from which the average rates are computed are longer at the beginning of the period, and progressively shorter as the end of the demand period is approached.

At the end of each sub-period, the demand limit is subtracted from the extrapolated value in order to determine by what number of megawatt hours the demand limit would be missed if this rate continued. This difference is called "delta E." It may take either a positive or a negative value; indicating, respectively, that the extrapolated power consumption exceeds or is less than the demand limit.

However, even if this extrapolated rate produces a positive delta E, and this rate should continue until the end of the demand period, there is still the possibility that the total plant load will decrease before the end of the demand period and thus make control of a furnace or other controllable load unit unnecessary. In this case, by having turned off the furnace, or removed the load unit, the load factor would have been reduced below the demand limit. For this reason a positive-going delta E alone does not cause the control system to remove a portion of the load, such as by turning off a furnace. Rather, the system makes another calculation to determine whether it is necessary to turn off the control furnace at this instant of time. At the end of each sub-period the system therefore computes the amount of power that would be consumed by the furnace in the time remaining in the demand period, by multiplying the furnace factor by the time remaining. The result is called the "controllable power." And, if the value of delta E is smaller than this value of controllable power, control is delayed at least until the end of the next sub-period when another calculation of delta E and another calculation of the controllable power are made. Thus, the furnace, or other load unit selected for control is turned off for a positive delta E only if delta E is equal to, or greater than, the amount of power that the controllable load unit would consume in the time remaining in the demand period.

On the other hand, if a furnace or other load unit has been removed from the system, and a load swing later causes delta E to go negative, this furnace or load-unit is not restored to the system until the value of delta E negative becomes equal to, or greater than, the amount of power that would be consumed by the furnace or other load unit in the time remaining if it were restored to the system. Thus, control actions are delayed until the last possible moment in order to permit normal load swings to average out without unnecessary control actions taking place. Because a new average rate, extrapolated value, delta E, and controllable power is computed at the end of each sub-period, random errors in these computations are corrected in subsequent sub periods.

Figure 2:
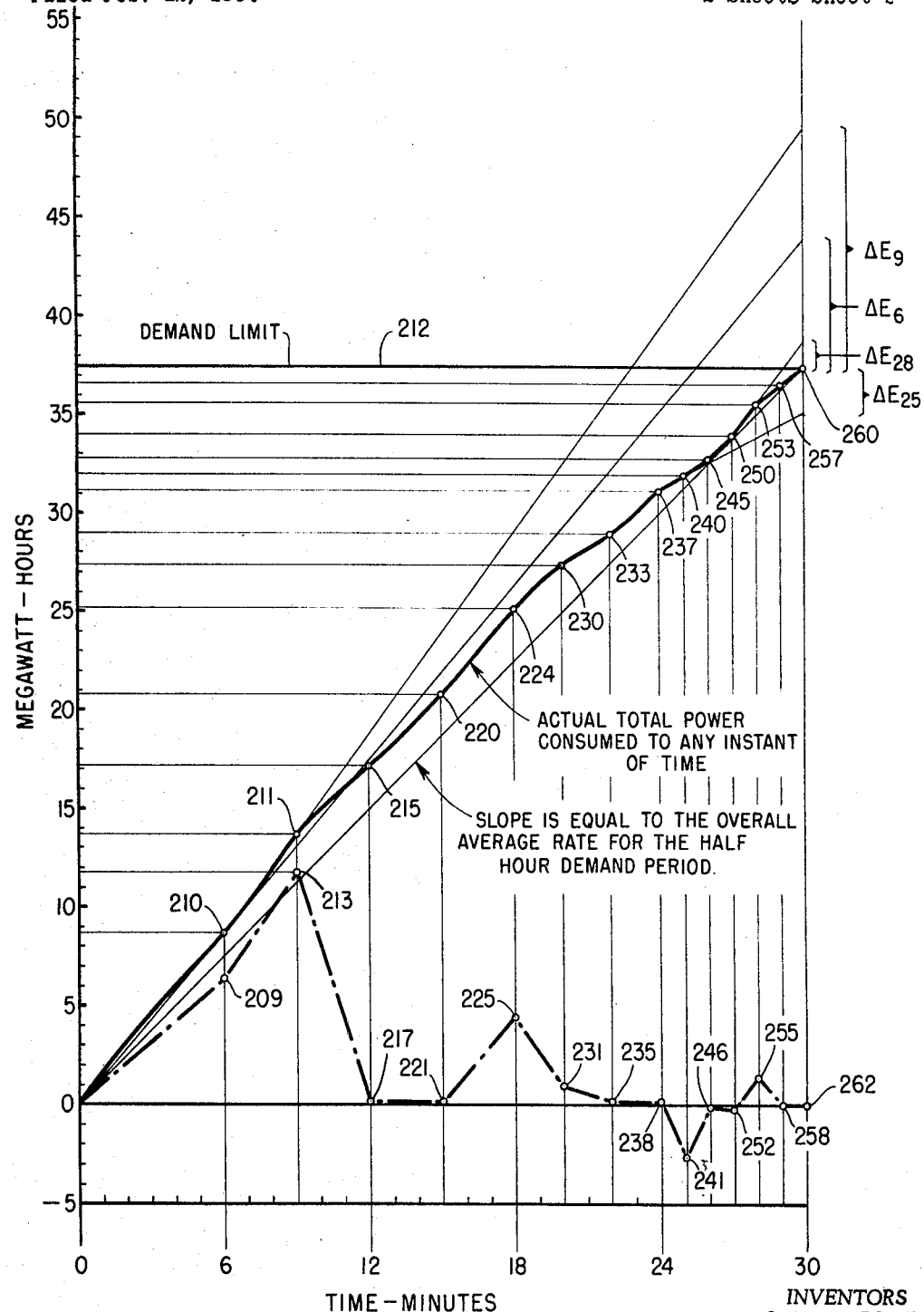

These and various other objects and features of the invention will be more clearly understood from a reading of the detailed description of the invention in conjunction with the drawing in which:

FIGURE 1 is a block diagram of a power demand predicting computer control system according to one illustrative embodiment of this invention; and FIGURE 2 is a graph illustrating the operation of the embodiment of FIGURE 1.

Referring now to FIGURE 1, there is depicted, in block form, a power demand predicting computer control system according to one illustrative embodiment of this invention. This system includes a clock and control unit 10 having a demand period start contact switch 12 for initiating the operation of the control system concurrently with the start of the demand period as established by the power company. The clock and control unit provides output signals of uniform type to synchronize the operation of the system. The clock and control unit 10 is provided with an elapsed time indicator 14 indicating the time which has elapsed after the initiation of the closure of the start contact switch 12 and a real time indicator 16 which may advantageously employ the 2400-time unit per day.

One of the output signals from the clock and control unit 10 is fed through a channel 20 to an input scanner and converter 22 which scanner and converter scans a plurality of impulse generating watt-hour meters such as 23, 24, 25, 26 and 27 measuring power input to the load system. Operatively associated with the input scanner and converter 22 are a plurality of groups of input conversion factor selector switches 28, 29, 30, 31 and 32, each group being operatively associated with one of the above mentioned watt-hour meters. The scanner and converter delivers pulses to a total plant power counter 40 indicative of the total plant power consumption in the elapsed portion of each demand period. By means of the groups of switches 28–32, the value, in one-tenth kilowatt hours, represented by each pulse from the associated watt-hour meter is established. Each time that a pulse is sensed at an input channel, the value in one-tenth kilowatt hours as selected in the associated group of conversion factor switches is fed through channel 36 and entered in the counter 40. This total count is delivered through a channel 42 to an extrapolated power computer 44 and is also delivered over channel 41 to a printer 46 at the end of each demand period. The extrapolated power computer 44 has operatively associated therewith an extrapolated power indicator 48.

The clock and control unit 10 also feeds signals over a channel 50 to a group of extrapolation interval selector switches 52 and the output signals from these switches 52 is fed over a channel 54 to the extrapolated power computer 44. The output of extrapolated power computer 44 is fed over a channel 56 to a delta E computer 60. The delta E computer also receives a signal from a demand limit selector switch 62 indicative of a manually set predetermined demand limit. The delta E computer subtracts the demand limit from the extrapolated power and delivers an output indicative of the polarity and magnitude of this difference.

The output of the delta E computer is fed to a controllable power and control computer 64 over a channel 65. The controllable power and control computer 64 is controlled by a furnace factor setting unit 66 over a plurality of channels 68, 69, 70 and 71, the details of which will be subsequently described. Control computer 64 feeds an output signal indicative of controllable power over channel 73 to printer 46 where this figure is recorded. The output of computer 64 is also fed over a plurality of channels 75, 76, 77 and 78 to control a corresponding plurality of controllable load unit control devices such as devices 80, 82, 84 and 86 which, in the particular instance of this embodiment, are furnace electrode control circuits.

The system includes a plurality of pulse generating furnace watt-hour meters 90, 92, 94 and 96, shown in the upper lefthand corner of FIGURE 1, each operatively associated with one of the furnaces or controllable load units. A plurality of furnace power counters 98 counts the pulses generated by these watt-hour meters and indicates the total power consumed by each of the furnaces during the elapsed portion of the demand period. The output signals in the form of electrical pulses are fed from furnace power counters 98 through a plurality of channels 102, 103, 104 and 105 to a control furnace selector unit 110. The output signals from the furnace power counters 98 are also fed over a channel 112 to the printer unit 46 where the corresponding values are recorded. The furnaces have operatively associated therewith furnace heat counters 114, 116, 118 and 120, each operatively associated with one of the furnaces. These heat counters include tilt-to-pour contacts 121, 122, 123 and 124. The output signals from the furnace heat counters are also fed over the output channels 126, 128, 130 and 132 to printer unit 46 where the corresponding values are also recorded.

Control furnace selector unit 110 includes a plurality of furnace tap setting contacts 140, 142, 144, and 146; the function of which will be subsequently described. Control furnace selector unit 110 also includes a plurality of furnace power contacts 150, 152, 154 and 156, each group of power contacts being operatively associated with one of the furnaces. The furnace control selector unit 110 has operatively associated therewith a cancel bypass pushbutton 160 and an inhibit control key switch 162, the functions of which will be subsequently described. The furnace control selector unit 110 has associated therewith a group of bypass furnace selector pushbuttons 164, 166, 168 and 170, each operatively associated with one of the furnace power contacts to control the bypassing of the associated furnace by control furnace selector 110. Control furnace selector unit 110 delivers output signals to a plurality of indicator lights 172, 174, 176 and 178 over a channel 180 to indicate which of the furnaces is being bypassed. The control furnace selector unit 110 also feeds output signals over channel 190 to a plurality of controlled furnace indicator lights 192, 194, 196 and 198. Output signals are fed from the control furnace indicator lights over a channel 200 to the printer unit 46 where a record is made of the furnace, or furnaces, being controlled.

The individual units will now be described in detail except where the designations are self-explanatory.

*Clock and control unit 10*

Clock and control unit 10 includes a calendar clock for disabling the control function during the demand periods in which power consumption is not restricted. This is accomplished by dividing a week into the demand periods. A wired program is used to eliminate control during preselected periods. This program is then repeated weekly. Holidays and other unpredictable periods may also be wired in or they may be handled by inhibit control key switch 162.

The calendar clock included in clock and control unit 10 may be a Chrono-log model 2500 digital clock which produces an electrical digital representation of time in terms of hours and minutes. It also provides signals for operating a 24-hour program control. The output of the calendar clock is a non-ambiguous, parallel, decimal contact closure pattern representing 24-hour time. Each digit position contact arrangement (units, minutes, tenths of minutes, units of hours and tenths of hours) has an external lead that may be used for obtaining the digits separately. As an example of the indication of 24-hour time, the time 3:27 p.m. is represented as 1527.

The clock and control unit 10 also includes a day of the week counter which is stepped each time the clock changes from 2359 to 00:00. The periods during which power companies require industrial loads to be closely regulated in order not to be penalized are usually from 0700 to 2300 and these periods are known as controlled demand periods and apply from Monday through Friday. Control may be inhibited automatically on Saturday and Sunday.

Starting from time 00:01, using Monday as an example, clock and control unit 10 delivers an inhibit control signal over channel 204 to prevent controllable power and control computer unit 64 from exercising control over furnace electrode control circuits 80, 82, 84 and 86 until 7 a.m. At 7 a.m., the inhibit control signal is removed, thereafter upon demand period start contact 12 closing, control begins. In other words, during the controlled demand period, power must be closely regulated during each one-half hour demand period as the revenue rate is determined on the basis of the maximum demand during the month or other billing period.

The clock and control unit 10 transmits timing signals over channel 202 to the printer 46 to cause the printer to print the time interval. This time printing is for the purpose of time logging and is entered in four digits. The elapsed time indicator 14 is connected to the clock and control unit 10 to indicate the time which has elapsed after the start of each demand period, as indicated by the closure of demand period start contact 12. Also connected to the clock and control unit is the real time indicator 16 which indicates the real time of day. The demand period start contact 12 is preferably closed simultaneously with the start of the power company's demand meter to assure synchronization of the demand periods of the control system with those of the power company.

*Input scanner and converter 22*

The input scanner and converter 22 includes meters which monitor the watt-hour consumption of the entire industrial load. Incorporated in these meters 23, 24, 25, 26 and 27 are suitable devices which generate pulses, each pulse representing a certain power consumption in kilowatt hours. It is understood that the input conversion factor selector switch 28 is cooperating with watt-hour meter 23. Similarly, switches 29, 30, 31 and 32 cooperate with meters 24, 25, 26 and 27, respectively. The watt-hours represented by a pulse generated in one of meters 23–27 may differ from the watt-hours represented by a pulse generated in another meter. Unit 22 generates pulses each representing a predetermined equal kilowatt hour from the input pulses having different values of kilowatt hours.

*Total plant power counter 40*

The pulses from the converter 22 are accumulated and multiplied by two in the total power counter 40 to place the power consumed in a half hour demand period on a megawatt-hour basis. An output signal indicative of this total is fed to extrapolated power computer 44 over channel 42.

*Extrapolated power computer 44*

The extrapolated power computer 44 computes the power which would be consumed within the demand period if the last recorded rate of consumption remained constant. These computations are performed on a basis of converging extrapolation. For example, the demand period which, for the sake of explanation of this invention, is assumed to be 30 minutes, is divided into a number of sub-periods. In this particular instance, the demand period is divided into 5 sub-periods of 6 minutes each. Within these 6 minute sub-periods, different extrapolation intervals of decreasing length may be employed. For example, in the first sub-period an extrapolation interval of 6 minutes may be employed. In other words, the extrapolated power computer will only extrapolate the power to be consumed a single time for the first sub-period. The second and third sub-periods may be divided into extrapolation intervals of 3 minutes each. Thus, for each sub-period the extrapolated power computer will twice extrapolate the power rate to determine total power consumption on this projected basis. The fourth sub-period is divided into three extrapolation intervals of two minutes each and the final, or fifth, sub-period is divided into six extrapolation intervals of one minute each.

At the beginning of a demand period the extrapolated power computer 44 is cleared to zero by a signal fed from clock and control unit 10. During the first extrapolation interval of length $n_1$ minutes, the total pulses from counter 40 are multiplied by $30/n_1$ in a multiplier section of computer 44. For example, an extrapolation interval selection of 6 minutes by the manual movement of interval selector switch 52A, will result in five pulses accumulated in the extrapolated power computer for each input pulse received from the total power counter 40. At the end of this 6 minute interval, the value stored in the extrapolated power computer 44 is five times the value stored in the total power counter 40 and represents the amount of power that would be used in one-half hour demand period (on an hourly basis) if the average rate of power consumed for the first 6 minute interval were continued for the remainder of the demand period. If the extrapolated interval selector switches 52 were to be placed at the 3 minute position for this first extrapolation interval, each input pulse would be multiplied by 10, resulting in a value in the extrapolated power computer 44 equal to 10 times that in the total power counter.

At the beginning of the second extrapolation interval the extrapolated power computer 44 is again cleared to zero. Following the start of the second extrapolation interval, pulses indicative of total power are again transferred from counter 40 to the extrapolated power computer 44. Because selector switch 52B is set at a value of 3 minutes, as it is in this particular instance, then each input pulse will be multiplied by $(30-6)/3$ or 8. These multiplied pulses are added to the total placed in the computer at the start of the interval. In other words, the extrapolation has been "corrected" for the actual amount of power used preceding this second interval. At the end of this second interval, the value existing in the extrapolated power computer 44 represents the amount of power that would be used in the demand period if power consumption continued at the same average rate as existed during the second interval.

Computer 44 repeats this process in a like manner for each of the succeeding intervals, taking the actual power consumption up to the beginning of an interval, and adding to it the power used during the interval times the multiplication factor for the interval. This factor is always equal to the time left at the start of the interval divided by the length of the interval.

*Extrapolation interval selector switches 52*

Included in this particular embodiment are five switches designated 52A, 52B, 52C, 52D and 52E. These switches control suitable circuitry such as a series of counters each operative over a particular sub-period of the demand period and controlled by the clock and control unit. In other words, switch 52A controls the first sub-period of six minutes of the demand period, or the period from 0 to 6 minutes in the demand period; switch 52B controls the second sub-period of the demand period or the period from 6 to 12 minutes of elapsed time in the demand period; 52C controls the third sub-period between the elapsed time of 12 to 18 minutes; switch 52D controls the period between 18 and 24 minutes in the demand period; and, switch 52E controls the sub-period of 24 to 30 minutes in the demand period. Each one of these switches 52A through 52E may be independently set to the desired number of extrapolation intervals within the sub-period.

Referring now to FIGURE 2, there is depicted a graph illustrating the operation of this system. The ordinants of this graph are megawatt hours while the abscissae are the time elapsed in the demand period. The demand period is divided into five equal sub-periods and these sub-periods are subdivided into extrapolation intervals which decrease for successive sub-periods. It is to be noted that the period from 0 to 6 minutes is divided into a single extrapolation interval of 6 minutes which is accomplished by setting switch 52A on "6," while the second demand period from 6 to 12 minutes is divided into two 3-minute intervals by setting switch 52B on "3." Similarly, the third sub-period from 12 to 18 minutes is divided into two 3-minute intervals by setting switch 52C on "3." The fourth sub-period of the demand period is divided into three two-minute intervals by setting switch 52D on "2" and the fifth sub-period between 24 and 30 minutes is divided into six one-minute intervals by setting switch 52E on "1." Each time the extrapolated power computer 44 computes the extrapolated power for the demand period it transmits an output signal indicative of this extrapolated power over channel 56 to the delta E computer 60.

*Delta E computer 60*

The delta E computer 60 receives a manually set signal indicative of a predetermined megawatt-hour demand limit from the circuit controlled by switches 62. For example, switch 62A sets the hundreds value of the demand limit, switch 62B sets the tens value of the demand limit, switch 62C sets the units value of the demand limit and switch 62D sets the tenths of megawatt-hours of the demand limit. The circuits in delta E computer 60, controlled by switches 62, will generate a digital signal indicative of the switch settings. Whenever computer 60 receives an extrapolated power signal over channel 56 from power computer 44, which extrapolated power signal is also a digital signal, it compares these two signals and delivers an analog output signal over channel 65 to the controllable power and control computer 64 indicative of the difference between these two signals. This difference may have either a positive or a negative value depending on whether the extrapolated signal exceeds or is less than the demand limit signal.

*Controllable power and control computer 64*

The purpose of computer 64 is to determine the proper time to remove or restore a furnace or furnaces or other controllable load units and to deliver corresponding signals to control circuits 80, 82, 84 and 86. Computer 64 compares two analog signals, a signal proportional to delta E with a signal that is proportional to the time remaining in the demand period times the net furnace factor. The net furnace factor for positive values of delta E is the furnace factor times a predetermined attenuation factor equal to, or less than, unity and the net furnace factor for negative values of delta E is the furnace factor times an amplification factor equal to, or greater than, unity. These two signals are compared in the control computer 64 by a null detector. The signal indicative of the time remaining in the demand period may be obtained from a variable potentiometer, the variable contact of which is driven by suitable switches driven by pulses from clock and control unit 10 fed over channel 204.

The net furnace factor for each furnace is manually set on a respective group of three switches of the switch unit designated 66. For example, switches 66A, 66B and 66C control the furnace factor, the amplification factor and the attenuation factor, respectively, for a first controllable furnace. Similarly, switches 66D, 66E and 66F control furnace factor, amplification factor and attenuation factor, respectively, for a second controllable furnace. The furnace factor switch may be set over a range of 50 to 100%, depending on the rate at which the respective furnace is to be heated. The attenuation factor and the amplification factor may be set to modify the output signal from the corresponding furnace factor circuit for causing removal of a controllable load unit to occur earlier, and restore to occur later than normal for any given value of delta E. Accordingly, an attenuation factor setting of 80% decreases the furnace factor signal by 20% so that the net furnace factor appears smaller to computer 64 for positive values of delta E. A setting of 110% on the amplification factor increases the corresponding net furnace factor signal 10% for negative values of delta E.

When the output of the previously mentioned control computer is positive, the furnace electrode control circuits 80, 82, 84 or 86 of the corresponding control furnaces selected by control furnace selector 110 are controlled.

In order to determine if the control computer 64 should control the load and the degree to which the load should be controlled, the computer 64 must receive signals indicating condition and power consumed by the individual controlled load units which, in this particular instance, includes a plurality of furnaces. Computer 64 must have information as to which of the furnaces is the last to be applied to the system and the availability for control of this furnace as well as the other furnaces. Control furnace selector 110 includes means for automatically selecting for control purposes one or more of the furnaces, which furnace or furnaces is known as the control furnace, or furnaces. The system includes furnace watt-hour meters 90, 92, 94 and 96, furnace power counter 98, and furnace selector means for scanning the individual power counters and selecting the furnace having the lowest power count. The control furnace must be charged and placed on the line and normally the last furnace charged and placed on the line will be immediately selected to act as the first furnace to be controlled. This scanning means includes the furnace power counter 98 which scans the group of furnace watt-hour meters 90, 92, 94 and 96 to determine which of the furnaces meet the required conditions to become a control furnace. One of the conditions of becoming a control furnace is that the furnace tap setting on the power transformer which supplies power to the furnace must be on one of its first two contact settings, namely, tap 1 or tap 2, which condition is indicated by a group of switches 140, 142, 144 and 146, each corresponding to one of the furnace transformers. Also, the associated furnace power-on contact from a group of contacts 150, 152, 154, and 156, associated with the respective furnaces, must be closed indicating that power is being supplied to the respective furnace before that furnace can be selected as the control unit.

When it is desired to inhibit or prevent control of any of the furnaces, this operation is accomplished by operating an associated bypass furnace selector button, or switch 164, 166, 168 and 170. The signal indicative of which of the furnaces has been selected for control is delivered over the channel 111 to the control computer 64. When it is desired to disable the control function, for example, during the thirty minute demand periods in which power consumption is not restricted by the power contract, a disable control function signal is fed from the clock and control unit 10 over channel 204 to control computer 64. If one or more of the furnace selector pushbuttons for bypassing the corresponding furnace is depressed then the corresponding lights 192, 194, 196 and 198 are illuminated.

Referring again to FIGURE 2, the operation of this control system is graphically illustrated. The solid line curve represents the actual total power consumed at any instant of time. The solid horizontal line is the demand limit as manually selected by demand limit setting selector switches 62.

As indicated by the graph, the power consumed at the end of the first extrapolation interval is indicated by point 210 and is approximately 8.7 megawatt hours. At the end of the second extrapolation interval, or at 9 minutes elapsed time of the demand period, the total power consumed is indicated by point 211 and is approximately 13.7 megawatts. No control action took place at the end of the first computer extrapolation interval, as the delta E or difference in power between the demand limit and the extrapolated value was approximately 6.0 megawatts. This figure alone and the fact that the extrapolated power exceeded the demand limit was not sufficient to cause the system to remove a portion of the load. Because the delta E increased during the second extrapolation interval to a figure of approximately 11.2 megawatts, the control of the furnace took place. The chain dotted line curve of delta E indicates at the end of the first extrapolation interval, as indicated by point 209, that delta E is positive by approximately 6.5 megawatts but the control action does not take place until the end of the second extrapolation interval and the delta E curve indicates this control action at point 213 from which point delta E decrease because a control furnace has been removed from the power system. At the end of the next extrapolation interval, which is 12 minutes elapsed time, the total power consumed is indicated by point 215. At this point the delta E curve has dropped to zero as indicated by point 217 on the chain dotted line graph.

At the end of the next extrapolation interval, or 15 minutes elapsed time, point 220 indicates the total power consumed and this power is indicated to be approximately 20.8 megawatts and the delta E curve indicates that the delta E figure is still zero as indicated by point 221. At the end of the next extrapolation interval, or 18 minutes of elapsed time, the total power consumed is indicated by point 224 and is indicated to be approximately 25.2 megawatts. The delta E value for this period is indicated to be approximately 4.6 megawatts as indicated by point 225. At the end of the next extrapolation interval, or after an elapsed period of 20 minutes, the total power consumed is indicated by point 230 and the delta E is indicated to have decreased to a value of approximately 1 megawatt as indicated by point 231 on the chain dotted line curve. This decrease in delta E has occurred through the natural fluctuation of the load and not due to the control action of the control system. At the end of the next extrapolation interval, or after an elapsed period of 22 minutes, the total power consumed is indicated by point 233 to be approximately 29 megawatt hours and the delta E value has decreased to zero as indicated by point 235 through the natural fluctuation of the load. At the end of the next extrapolation interval, or after an elapsed period of 24 minutes, the total power consumed is illustrated by point 237 and is approximately 31.2 megawatts and the value of delta E is indicated to have remained at zero as indicated by point 238.

During the next sub-period, or the final sub-period of 6 minutes, the extrapolation intervals are one minute each and the extrapolation interval at the elapsed time of 25 minutes indicates that the total power consumed is approximately 32 megawatts as indicated at point 240 and the value of delta E has become a negative value of approximately 2.4 as indicated by point 241. Because one of the important aspects of this invention is to use the maximum possible power, it is essential that the actual power consumed approach the demand limit setting as closely as possible without exceeding this value. Accordingly, at point 241, or at a period of 25 minutes elapsed time, the control furnace is restored to the line and the reason for this furnace being restored is that the power consumed by the control furnace will not exceed the difference in power between the extrapolated value and the demand limit setting within the next five minutes or the time remaining within the demand period. As the result of restoring the control furnace the power consumed at the end of the next extrapolation interval increases as indicated by point 245. This value is approximately 32.8 megawatts.

At the end of the elapsed time of 26 minutes, the value of delta E has returned to zero as indicated by point 246 due to the restoration of the control furnace to the load. At the end of the next extrapolation interval, or an elapsed period of 27 minutes, the total power consumed is indicated by point 250 to be approximately 34 megawatts and the value of delta E has remained at zero as indicated by point 252. At the end of the next extrapolation interval, or after an elapsed time of 28 minutes, the total power indicated by point 253 is approximately 35.6 megawatts and the value of delta E has become positive as indicated by point 255 and this value is approximately 1.4 megawatts. Because the time remaining is relatively short, i.e., two minutes, the function of the control system is accentuated to remove the control furnace from the load and thus the power consumed at the end of the next extrapolation interval, as indicated by point 257, is 36.6 megawatts and the value of delta E, as indicated by point 258, has decreased to zero. At the end of the final extrapolation interval, the total power consumed for the entire demand period is plotted at point 260 and is indicated to have just equaled the demand limit setting of 37.5 megawatts and the value of delta E has remained at zero as indicated by point 262.

Thus, the system of converging extrapolation has resulted in the utilization of the exact amount of power as manually set into the system in the demand limit setting switches 62. In controlling the load, the controllable power and control computer 64 operates through its channels 75, 76, 77 and 78 to actuate whichever of the furnace electrode control circuits is being controlled. In other words, whichever of circuits 80, 82, 94 or 86 is being controlled. The operation of these circuits is to withdraw the control electrodes or furnace electrodes to break the arc between furnace electrodes. When the furnace is restored, the control circuits move the electrodes into arc engaging or arc creating position. In the foregoing explanation of the operation, a 33 megawatt furnace, having a furnace factor setting of 100%, was the control furnace. This furnace was controlled at 9 minutes by removing the furnace from the distribution system through the operation of the control circuits which opened the arc creating path. This load unit was restored to the system at 25 minutes by moving the arc creating electrodes into engagement and withdrawing these electrodes into a position to maintain the arc. The furnace electrodes were again withdrawn at 28 minutes to remove the furnace from the power system to prevent the total power from exceeding the demand limit. The control and restore action alters the slope of the power consumed curve to a rate required for intercepting the demand limit of 37.5 megawatts. The actual values of the demand limit and the values of the load are, of course, arbitrarily chosen for the purpose of illustrating the principles of this invention. The same principles would apply to any other type of unit load such as large electric motors or heating devices and these devices would be removed from the system in any manner well known in the art.

While we have shown and described one illustrative embodiment of this invention, it is understood that the concepts thereof may be employed in other embodiments without departing from the spirit and scope of this invention. For example, a system employing a delta E computer could be utilized as a basis for manually controlling electrical load systems, or a system employing an extrapolated power computer with its associated input networks could be employed as a basis for manual control of an electrical system.

What we claim is:

1. In combination with a power demand predicting computer control system for controlling at least one of a plurality of load units of the type wherein a clock and control system provides time base synchronization of the computer control system, a plurality of watt-hour meters, each operatively associated with one of said load units, monitors the power consumed by said load units and produce electrical pulses proportional to power consumed, a load unit input scanner and converter converts the random watt-hour meter pulses to a common unit of watt-hour consumption and emits pulses proportional thereto, an input conversion factor selector switch controls the rate of generation of said pulses in response to the respective readings of said watt-hour meters, a total power counter connected to the output of the input scanner and converter for counting pulses, an extrapolated power computer having a plurality of inputs, one being connected to the output of said total power counter, and an extrapolation interval selector switch coupled between the clock and power computer for controlling the interval at which said extrapolated power computer extrapolates, on a projected basis, the value of power which would be consumed during a demand period, wherein the improvement to said computer system comprises:

extrapolation interval selector switches consisting of a plurality of sub-period selector switches and a plurality of interval selector switches associated with each sub-period selector switch whereby the number of selected sub-periods and the number of extrapolating intervals within said sub-period may be selected to fulfill a specific requirement;

a delta E computer means having a demand limit selector switch means for setting a demand limit for the control system and for developing an electrical signal indicative of this demand limit, said delta E computer comparing said demand limit to the output of said extrapolated power computer means; said delta E computer having its input connected to the output of said extrapolated power computer means;

a controllable power and control computer means coupled to the delta E computer output and to said clock and control means for computing the power which would be consumed by a selected load during the remainder of the demand period and for controlling said selected load unit in accordance with the value and polarity of delta E computer output signal; said clock and control means functioning to disable the control function of said controllable and power and control computer means during predetermined periods; and a plurality of load unit control circuits connected to the output of said controllable power and control computer wherein said computer actuates said control circuits to regulate one of said load units by actuating one of said control circuits.

2. The combination according to claim 1 further including unit load factor control means for controlling the sensitivity of said controllable power and control computer in accordance with the magnitude and polarity of the delta E output signal and for separately adjusting the control computer sensitivity to the delta E signals of opposite polarity.

3. The combination according to claim 2 further comprising load unit selector means for selecting at least one unit of the electrical load as the control unit, said selector means being coupled to said controllable power and control computer for indicating said control unit to said controllable power and control computer and for controlling the operation of said control computer in accordance with the condition of said load units.

4. The combination according to claim 3 further comprising switch means coupled to said unit loads and to said selector means for delivering a signal to said selector means indicative of the condition of each of said load units.

5. The combination according to claim 4 further comprising a plurality of unit load bypass selector switches, each for controlling said selector means to bypass one of said load units, and a plurality of indicators, each operatively associated with one of said bypass selector switches for indicating which of said unit loads has been bypassed; said bypass selector switches operatively associated with said load unit selector means for inhibiting the selection of certain of said load units by said load unit selector means.

6. The combination according to claim 5 further comprising inhibit control switch means coupled to said load unit selector means for inhibiting the operation of at least one of said bypass switch means.

7. The combination according to claim 6 further comprising cancel bypass switch means for disabling said bypass switch means.

8. The combination according to claim 3 further comprising power switch means operatively associated with said selector means for controlling said load unit selector according to the power condition of at least one of said load units.

9. The combination according to claim 8 further comprising a plurality of load unit power counter means and operatively associated with one of said load units for indicating the power consumed by said load units.

10. The combination according to claim 9 further comprising a plurality of watt-hour meters, each operatively associated with one of said power counter means and each operatively associated with one of said load units.

11. The combination according to claim 10 further comprising printer means coupled to said load unit power counter means and to said total power counter means for recording total power consumed and the power consumed by said load units.

References Cited

UNITED STATES PATENTS

| | | | |
|---|---|---|---|
| 2,861,196 | 11/1958 | Brownlee | 307—57 |
| 2,836,730 | 5/1958 | Early | 235—151.21 |
| 2,998,917 | 9/1961 | Werme | 235—151.21 |
| 3,173,002 | 3/1965 | Starr | 290—4 |

MALCOLM A. MORRISON, *Primary Examiner.*

MARTIN P. HARTMAN, *Examiner.*